United States Patent
Müller

(10) Patent No.: US 6,846,255 B2
(45) Date of Patent: Jan. 25, 2005

(54) PRESSURE FEED TO A SHAFT

(75) Inventor: Klaus Müller, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 126 days.

(21) Appl. No.: 10/286,505

(22) Filed: Oct. 31, 2002

(65) Prior Publication Data

US 2003/0092517 A1 May 15, 2003

(30) Foreign Application Priority Data

Nov. 13, 2001 (DE) .......................................... 101 55 721

(51) Int. Cl.⁷ ........................... F16H 9/18; F16H 61/06
(52) U.S. Cl. .......................................... 474/18; 474/28
(58) Field of Search ........................ 474/18, 28, 69–70, 474/46, 30; 477/45, 46, 48

(56) References Cited

U.S. PATENT DOCUMENTS

| | | | | |
|---|---|---|---|---|
| 4,881,925 A | * | 11/1989 | Hattori | 474/18 |
| 5,269,726 A | * | 12/1993 | Swanson et al. | 474/28 |
| 5,462,035 A | * | 10/1995 | Teraoka et al. | 474/18 |
| 6,015,359 A | * | 1/2000 | Kunii | 474/18 |
| 6,394,920 B1 | | 5/2002 | Morlok | 474/28 |
| 2001/0016527 A1 | | 8/2001 | Hiroshima et al. | 474/8 |

FOREIGN PATENT DOCUMENTS

| | | | | |
|---|---|---|---|---|
| DE | 21 48 819 B2 | | 7/1981 | ........... F16H/57/04 |
| DE | 195 33 993 A1 | | 3/1997 | ........... B60K/17/04 |
| DE | 199 21 749 A1 | | 11/1999 | ........... F16H/55/56 |
| DE | 199 32 339 A1 | | 1/2001 | ........... F16H/63/06 |
| DE | 100 60 149 A1 | | 7/2001 | ........... F16H/57/00 |
| FR | 2618513 A1 | * | 1/1989 | .................. 474/18 |
| GB | 1 406 298 | | 9/1975 | ........... F16H/57/04 |
| JP | 58137654 A | | 8/1983 | ............. F16H/9/18 |
| JP | 61-105345 A | * | 5/1986 | ............. F16H/9/18 |
| JP | 61-109951 A | * | 5/1986 | ............. F16H/9/18 |
| JP | 05-288261 A | * | 11/1993 | .................. 474/18 |
| JP | 11-153213 A | * | 6/1999 | ........... F16H/57/02 |
| JP | 11-159589 A | * | 6/1999 | ............. F16H/9/18 |

* cited by examiner

*Primary Examiner*—Marcus Charles
(74) *Attorney, Agent, or Firm*—Davis & Bujold, P.L.L.C.

(57) ABSTRACT

A pressure feed in a shaft (1) of a transmission with a hydraulic or pneumatic control device through which the pressure feed can be acted upon with the pressure medium, with a gearbox (2), in which the shaft (1) is positioned through at least one bearing (3), whereby the gearbox (2) has a beating bore (4) in the region of the bearing (3) and whereby the bearing (3) is affixed axially in the gearbox (2) using a retaining sheet (5), with a gearbox cover (6) which covers the bearing bore (4) of the gearbox (2) and has feeding bores (7, 8) through which the pressure medium is transmitted from the hydraulic or pneumatic control device to the shaft (1). A pressure line (10) consisting of a tube (11) and a connection piece (12) inseparably connected pressure-tight to the tube be arranged between the hydraulic control device and a feeding bore (8) of the gearbox cover (6) arranged parallel to the shaft (1). The detachable connection piece (12)is separably inserted pressure-tight into the feeding bore (8) of the gearbox cover (6) running parallel to the shaft (1) and has a collar (13) for axially affixing the pressure line (10) in the gearbox (2). The retaining sheet (5) of the gearing (3) affixes the bearing (3) in the gearbox (2) as well as the pressure line (10) through the collar (13) of the connection piece (12) axially in the gearbox (2).

7 Claims, 1 Drawing Sheet

PRESSURE FEED TO A SHAFT

FIELD OF THE INVENTION

This invention concerns pressure feed in the shaft of a transmission, particularly in a variable speed shift of a continuously variable transmission.

BACKGROUND OF THE INVENTION

Pressure feeds in a rotating shaft, located in a gearbox are known. For instance, DE 199 21 749 A1 describes pressure oil feed into a primary shaft of a variable speed transmission of a continuously variable automatic transmission. The primary shaft is located in the gearbox housing using a bearing. In the region of this bearing, there is a bore of the bearing that penetrates the wall of the housing in the gearbox housing. The bearing is fixed axially in the gearbox with a locking ring. To ensure constant pressure oil supply to the variable speed transmission, an electro-hydraulic control device is provided which is arranged vertically toward the bore of the bearing on the face of the gearbox and which at the same time covers the bore of the bearing in the gearbox. The supply of oil from the electro-hydraulic control device into an axial bore of the primary shaft takes place through a coupler system, in which two tubes fitted into one another are inserted oil-tight into the step bore of the electro-hydraulic device. Both the tubes project into the axial bore of the primary shaft by means of a sliding bearing. The outer tube is axially fixed to the electro-hydraulic control device through a retaining sheet. The inner tube does not have any axial locking.

A pressure feed for the variable speed shaft of a continuously variable transmission has been made known in DE 199 32 339 A1 submitted by the Applicant. According to this, the pressure oil supply from a hydraulic transmission control device takes place through an oil supply channel arranged in the gearbox and subsequently through an oil supply channel arranged in a gearbox cover into an axial step bore of the variable speed shaft. The variable speed shaft is positioned in the gearbox through at least one bearing and the bearing is placed in a corresponding bore of the bearing within the gearbox and the bearing is affixed axially in this bore using a retaining sheet. The bore of the bearing is constructed like a connecting bore, into which the variable speed shaft projects and the cover of the gearbox covers the bore. A tubular projection of the gearbox cover projects into the axial step bore of the variable speed shaft and is sealed against the rotating variable speed shaft by means of a rectangular piston ring. The pressure oil is led from a gearbox channel into a gearbox cover channel running parallel to the shaft. From there, it is then led to a bore in the gearbox cover which runs vertically toward the shaft and subsequently through an inner axial bore of the tubular projection of the cover to the variable speed shaft. A flat packing seals the oil supplying channels on the outer surface along the parting line between the gearbox and the gearbox cover.

The object of the current invention is to further develop a pressure feed from a hydraulic or pneumatic transmission control device into a gear shaft, particularly for applications where the loss in pressure from the hydraulic or the pneumatic control device to the shaft does not take place in the immediate vicinity of the shaft, considering the problems arising out of the proximity, particularly in case of high pressures.

SUMMARY OF THE INVENTION

Staring from the known state of the art, the pressure feed in a shaft comprises a hydraulic or a pneumatic control device through which the pressure feed with pressure medium can be acted u upon, a gearbox housing, in which the shaft is positioned through at least one bearing, whereby the gearbox has a bearing bore penetrating the gearbox housing in the region of the gearing as well as a housing cover that covers the bore of the bearing in the gearbox. The gearbox cover has feeding boreholes, through which the pressure fluid from the hydraulic or pneumatic control device is introduced into the shaft, particularly from a surface of the shaft in the region of the bearing and proceeding into an axial bore of the shaft. The gearing is affixed axially in the gearbox using a retaining sheet.

In accordance with the invention, it is suggested that a pressure line, consisting of a tube and a connection piece fitted inseparably and pressure-tight to the tube, be placed between the hydraulic or pneumatic control device and a feed borehole of the housing cover aligned parallel to the shaft. The connection piece is inserted, separably pressure tight, in the feed borehole and arranged parallel to the shaft on the front face of the housing cover. The end of the tube, opposite to the connection piece, is separably connected pressure tight to the pressure outlet channel of the hydraulic or the pneumatic control unit. A collar is provided on the connection piece of the pressure line to affix the pressure line axially in the gearbox.

The retaining sheet affixes both the bearing axially to the gearbox as well as the pressure line through the collar of the connection piece.

Advantageously, even under high pressure, a secure pressure-tight connection is guaranteed between the hydraulic or pneumatic control device and the shaft, because the pressure-dependent supporting forces cannot lead to an undesired axial displacement of the pressure line. The hydraulic or pneumatic control device must not be placed in the immediate vicinity of the shaft. The pressure feed system of the invention moreover is built in a manner that is easy to install, particularly with the absence of an additional axial lock of the pressure line to be fastened. The parallel character of the shaft, the gearbox cover and the detachable plug connection of the pressure line to the gearbox cover make installation and disassembly of the gearbox cover simpler. The process of installing the hydraulic or the pneumatic control device within the gearbox can also be independent of the installation of the pressure feed from the control device to the shaft.

As a refinement of the invention, it is suggested that the tube and the connection piece of the pressure line either be soldered or welded or pasted together. As against a press fit between the tube and the connection, this would reduce the risk of leakage in the region of the joint, both during installation as well as in operation under varying pressure loads and dynamically vibrating loads.

A pressure feed in the manner described is suitable particularly for a pressure feed into a variable speed shaft of a continuously varying automatic transmission. Since a relatively higher volumetric flow, partly under high pressure, needs to be fed to the rotating shaft, it is convenient to introduce pressure axially in the rotating shaft.

The axial space requirement for the pressure feed in accordance with the invention in the region of the front face of the bearing is relatively small and is limited to the geometric measurements of the bearing cover allowing for the necessary cross sections and thickness of walls of the pressure channels arranged in the gearing cover. The hydraulic control device, which supplies pressure oil to the variable speed shaft, can be arranged parallel to the variable speed shaft, thereby reducing the length of the transmission.

Obviously, the application of the pressure feed in a gear shaft is universally usable and is not merely confined to the application of pressure feed in a variable speed shaft pressure feed, described earlier as an illustration.

BRIEF DESCRIPTION OF THE DRAWING

The invention will now be described, by way of example, with reference to the accompanying drawings in which.

DETAILED DESCRIPTION OF THE INVENTION

Figure 1:
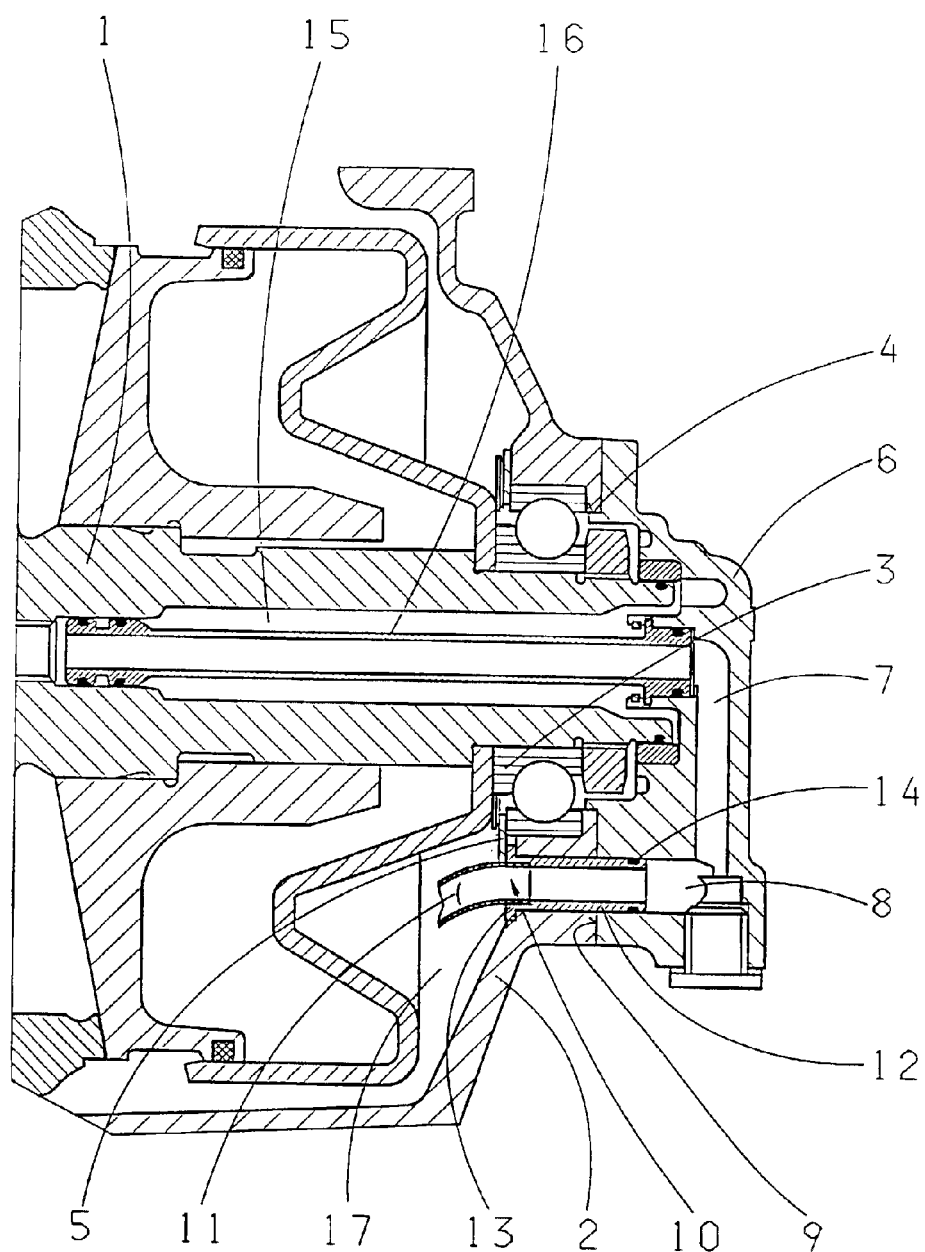
FIG. 1 shows a pressure feed in a rotating variable speed shaft of a continuously variable transmission as an executed example of a pressure feed of the invention.

A shaft of a transmission in indicated with 1, in the embodiment represented, the variable speed shaft of the continuously variable automatic transmission. The shaft 1 passes through a bearing 3, which is, for instance, constructed as a roller bearing and placed in a gearbox 2. The shaft 1 penetrates the gearbox 2 in the region of the bearing borehole 4 corresponding to the bearing 3.

The bearing bore 4 is covered with housing cover 6. The bearing 3 is axially affixed on the shaft 1 using a shaft nut and in the gearbox 2 using a retaining sheet 5. The specialist will obviously be aware of other designs for orienting the shaft 1 in the gearbox 2. The shaft 1 has at least one axial shaft bore 15 on the shaft end facing the bearing cover 6 through which the pressure fluid from a transmission hydraulic or pneumatic control device, not represented here, is introduced into the shaft 1. In the embodiment given, this axial shaft bore 15 is constructed as a stepped borehole in which a non-threaded tube 16 carrying the pressure fluid is arranged. The pressure feed into the axial shaft bore 15 or into the non-threaded tube takes place through several feeding boreholes 7,8 which are positioned in the bearing cover 6. In the embodiment, the feeding bore 7 rungs within the gearbox cover 6 perpendicular to the shaft 1 and on the one hand opens into the non-threaded tube 16, and on the other into the feeding bore 8 which runs parallel to the shaft 1 within the gearbox cover. This feeding bore 8 is sealed towards the surface of the gearbox and opens into the region of front surface 9 of the gearbox cover 6, facing the bearing bore 4 in the gearbox 2.

In accordance with the invention, a pressure line 10, comprising a tube 11 and a connection piece 12, is installed preferably from the interior 17 of the gearbox 2 and arranged between the feeding bore 8 of the gearbox cover 6 running parallel to the shaft 1 and the pressure outlet channel of the hydraulic or pneumatic control device of the transmission (not represented). The tube 11 and the connection piece are moreover inseparably connected pressure-tight to each other, for instance, by means of a press fit, a soldered joint, a welded joint or even a glued joint.

The side of the tube 11 opposite the connection piece is separably connected pressure-tight with the pressure outlet channel of the hydraulic or pneumatic control device of the transmission, by using, for instance, a plug connection sealed off by means of a sealing ring. The side of the connection piece opposite to the tube 11 is separably connected pressure-tight to the feeding bore 8 of the gearbox cover 6 running parallel to the shaft. In the example presented, the connection piece 12, in the installed state, projects into the feeding bore 8 and is sealed off against the diameter of the feeding bore using a sealing ring 14. Obviously, the joint between the connection piece 12 and the feeding bore 8 can also be constructed differently, for instance, like a flat receptacle or flat packing.

To prevent an unintended axial displacement of the pressure line 10 when in operation, especially during admission of pressure, the pressure line 10 is affixed axially relative to the gearbox 2. In accordance with the invention, retaining sheet 5 of the bearing 3 not only affixes the bearing 3 axially in the gearbox but also affixes the pressure line 10 through a collar 13 of the connection piece 12 axially in the gearbox 2. Advantageously, this double function of the retaining sheet 5 simplifies installation and also the disassembly of the transmission considerably.

Reference Numbers 1 shaft
2 gearbox
3 bearing
4 bearing borehole in the gearbox
5 bearing retaining clip
6 gearbox cover
7,8 feed boreholes in the gearbox cover
9 front face of the gearbox cover
10 pressure line
11 tube of the pressure line
12 connector piece of the pressure line
13 collar of the connection piece
14 sealing ring of the connection piece
15 axial shaft bore
16 non-threaded tube of the shaft
17 interior of the gearbox

What is claimed is:

1. A pressure feed system for a variable speed shaft of a continuously variable transmission, the pressure feed system comprising:

a hydraulic and a pneumatic control device from which a pressure line (10) containing a pressure fluid is connected a gearbox (2) of a transmission in which a shaft (1) is supported by at least one bearing (3);

the gearbox defines a bearing bore whereby the bearing (3) is located axially about the shalt in the gearbox (2) by means of a retaining clip (5);

a gearbox cover (6) which covers the bearing bore (4) of the gearbox (2) and has a pressure supply feed bore (8) through which the pressure fluid from the control device is fed to the shaft (1), the pressure line (10) comprises a tube (11) and a connector (12) inseparably connected in a pressure-tight manner to the tube (11), the tube and the connector are arranged between the control device and the feed bore (8) of the gearbox cover (6); and wherein the pressure supply feed bore (8) is formed in the gearbox cover (6) disposed parallel to and communicating with the shalt (1), and the tube (11) has a first end connected in a pressure-tight manner to a pressure outlet channel of the control device and a second end attached parallel to the shaft (1) through a collar (13) of the connector (12) into the feed bore (8) and the retaining clip (5) securing the bearing (4) additionally affixes the tube (11) through the collar (13) of the connection piece (12).

2. The pressure feed according to claim 1, wherein the tube (11) and the connector (12) of the pressure line (10) are one of a press fitted, soldered, welded and glued to each other.

3. The pressure feed according to claim 1, wherein the shaft (1) is a variable speed shaft of a continuously variable automatic transmission.

4. A pressure feed system for controlling operation of a transmission comprising:

a hydraulic and pneumatic control device;

a gearbox having a bore defining an axis;

a shaft located in the gearbox aligned axially with the bore of the gearbox;

at least one beating supporting the shaft in the gearbox and held by a retaining ring;

a gearbox cover comprising at least a feed bore hole aligned parallel to the shaft through which a pressure fluid from the control device is fed to the shaft, covering at least a portion of the bore of the gearbox;

a pressure line comprising a tube and a connector connected in a pressure-tight manner is arranged between the control device and the feed bore hole of the gearbox cover;

the connector of the pressure line comprising a collar for affixing the pressure line to the teed bore hole in the gearbox cover; and the retaining ring of the bearing is aligned adjacent to the connector and additionally affixes the pressure line through the collar of the connector.

5. The pressure feed system according to claim 4, wherein the tube and the connector of the pressure line are a connection by one from the group of press fitted, soldered, welded and glued.

6. The pressure feed system according to claim 4, wherein the shaft is a variable speed shaft of a continuously variable automatic transmission.

7. The pressure feed system according to claim 4, wherein the gearbox cover comprises a pathway which opens on a first end axially to the bore of the gearbox, extends perpendicular to the shaft, and opens on a second end to the feed bore hole parallel to the shaft end towards the pressure line.

* * * * *